C. C. SANDERSON.
Self-Leveling Ship's Berth.

No. 228,279. Patented June 1, 1880.

Attest,
W. H. H. Knight
W. Blackstock.

Inventor
C. C. Sanderson
by Wright & Brown
Attys.

UNITED STATES PATENT OFFICE.

CHARLES C. SANDERSON, OF DEDHAM, MASSACHUSETTS.

SELF-LEVELING SHIP'S BERTH.

SPECIFICATION forming part of Letters Patent No. 228,279, dated June 1, 1880.

Application filed February 24, 1880.

*To all whom it may concern:*

Be it known that I, CHARLES C. SANDERSON, of Dedham, in the county of Norfolk and State of Massachusetts, have invented a new Self-Leveling Ship's Berth, of which the following is a specification.

This invention relates to that class of self-leveling berths in which the berth is connected by a universal joint to a fixed support under the berth, so as to oscillate freely laterally and longitudinally, and is provided with a counterbalancing weighted lever located below the center of motion.

The invention has for its object to enable the radius of the berth above the universal joint to be made as short as possible, or, in other words, to enable the center of gravity of the berth to be brought as near the center of motion as possible, thereby reducing to the utmost the movement of the entire berth in the arc of a circle whose center is the universal joint and the berth, and enabling the weighted lever to extend as far as possible below its center of motion, thereby giving the weight, which is at the lower end of the lever, the greatest possible counterbalancing effect.

The invention relates, also, to the combination of an upper and a lower berth, each pivoted to a support beneath it, the lower berth having a counterbalancing-weight, and the two berths being so connected as that the upper shall oscillate with the lower.

This part of my invention has for its object to provide connecting devices between the two berths which are capable of being contracted, so that the lower berth with its contents and attachments will be partially sustained by the support of the upper berth and act as a pivoted counterbalancing-weight for said upper berth.

My invention also has for its object to provide the universal joints of a pivoted berth with torsional springs having a tendency to overcome the impetus given the berth by its momentum and keep it as nearly as possible in a state of rest.

My invention also has for its object to provide a pivoted counterbalanced berth or a connected lower and upper berth with a series of upwardly-pulling springs exerting an upward pressure to reduce the weight of the berth above its center of motion and the friction on the universal joint.

My invention also has for its object to prevent injury to the bottom of the berth and the mattress thereon when the center of gravity of the berth is close to the center of motion.

To these ends my invention consists in the several improvements which I will now proceed to describe and claim.

Figure 2:
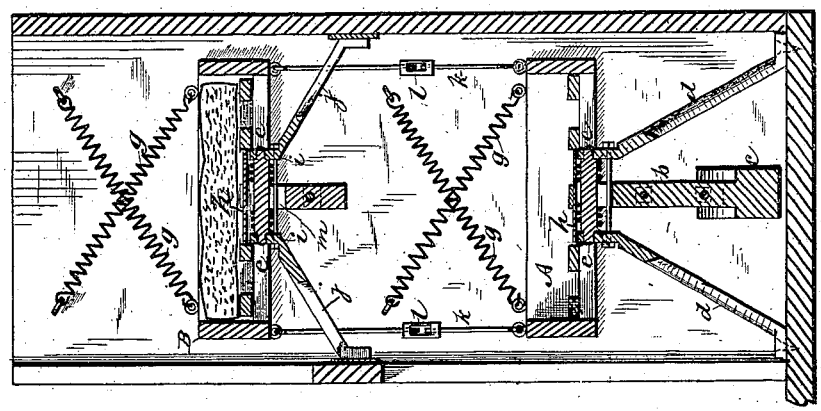
Figure 1:
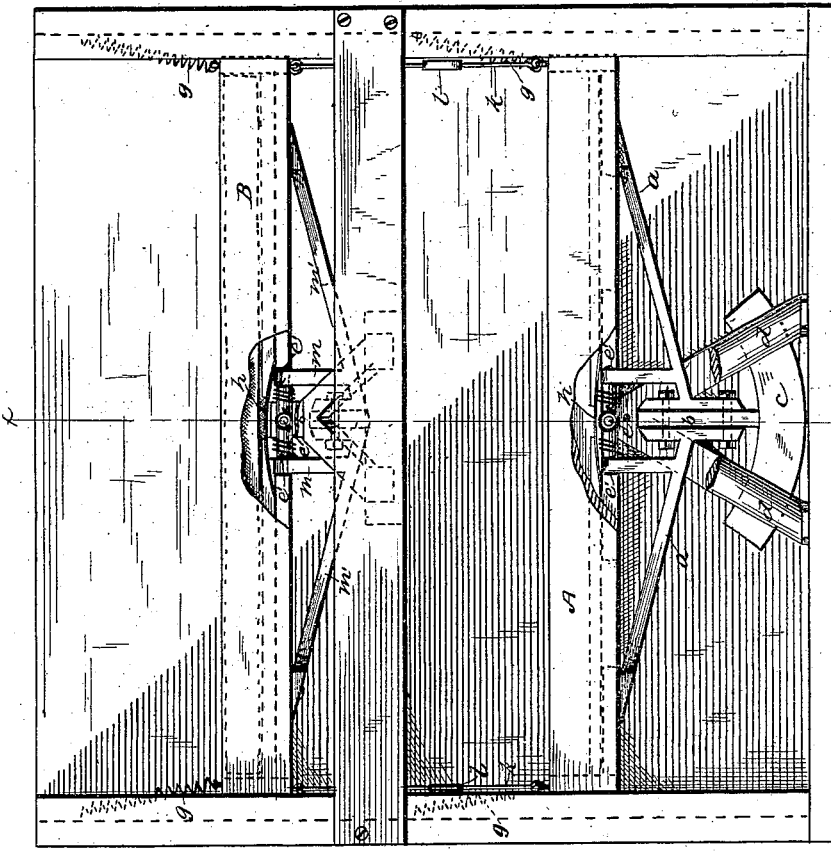
Figure 3:
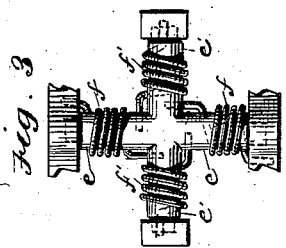

Of the accompanying drawings, forming a part of this specification, Figure 1 represents a side elevation of an upper and a lower berth embodying my invention. Fig. 2 represents a transverse vertical section on line $x\,x$, Fig. 1. Fig. 3 represents a plan view of one of the universal joints with its torsional springs.

The same letters of reference refer to the same parts in all the figures.

In the drawings, A represents the berth, of any suitable construction.

$d$ represents a stout frame or support bolted to the deck or floor of the cabin.

Beneath the berth is a universal joint composed of four trunnions, $e\,e\,e'\,e'$, rigidly connected together, and arranged at right angles to each other in the form of a cross, as shown in Fig. 3.

The trunnions $e\,e$ enter bearings in the top of the frame $d$, and the trunnions $e'\,e'$ enter bearings in the bifurcated upper end of a weighted lever, $b$, which is thus connected by the universal joint to the frame $d$, and is capable of oscillating in two directions.

The berth A is rigidly attached to the lever $b$ by braces $a\,a$, extending from the opposite ends of the berth to points on the lever $b$ below its center of motion, so that the berth moves with the lever.

It will be seen that by this construction the following advantages are secured: First, the lever $b$ does not require to be extended above its center of motion far enough to afford a surface or surfaces for the attachment of the berth; hence the lever can practically terminate at its center of motion, and the center of gravity of the berth can be brought close to the center of motion, so that the berth will have no perceptible bodily movement in the arc of a circle whose center is the universal joint to the berth; second, the lever $b$ is enabled to extend as far as possible below the center of motion, so that its weight $c$, at its lower end, may have the greatest possible effect or leverage, the space between the bottom of the berth and the deck or floor being usually somewhat limited.

B represents an upper berth, connected by a universal joint to lugs $i\ i$ on bars or brackets $j\ j$, which are rigidly attached to the casing of the berth or wall of the cabin. The universal joint of the berth B is like the joint of the berth A, and its trunnions $e'\ e'$ enter lugs $m\ m$, attached to the berth by braces $m'\ m'$ or otherwise. The upper berth is thus supported from below independently of the lower berth.

K K K K represent four vertical metallic rods extending from the corners of the berth B to the corresponding corners of the berth A. Each of these rods is made in two parts, connected by a screw-coupling or turn-buckle, $l$, whereby the rods may be contracted or extended.

By contracting the rods K the berth A, with its contents and attachments, may be slightly raised, so that its weight will be partially sustained by the supports of the berth B. The berth A will therefore become a counterbalancing-weight for the berth B, as will be readily seen.

It is usual in this class of berths to provide a series of springs connecting the opposite ends of the berth with some rigid portion of the vessel to check the oscillation of the berth; but heretofore when a series of springs have been employed they have been arranged to pull downwardly.

I employ a series of very strong springs, $g\ g\ g\ g$, connecting the ends of the berth-frame to the casing, and arranged to pull upwardly and exert an equal upward pressure on each end of the berth, the springs being arranged in pairs, as shown.

By this arrangement of springs I practically reduce the weight of the berth and the friction on the pivots and bearings of the universal joint.

The springs may be employed in connection with both berths, as shown, and may be of metal or rubber.

As auxiliaries to the springs $g$, I provide the trunnions of the universal joints with torsional spiral springs $f\ f\ f'\ f'$. Each of these springs is attached at one end to the trunnion on which it is located, and at the other end to the part that receives such trunnion, as shown in Fig. 3. The tendency of the springs is to bring the berth to a state of rest, and they operate in pairs, the springs $f\ f$ acting when the berth is oscillating longitudinally and the springs $f'\ f'$ when the berth is oscillating laterally.

When the berth is at rest one spring of each pair neutralizes the action of the other spring of the same pair.

To prevent the berths in their transverse oscillations from striking the universal joints and their supporting-frames, a recess is formed in the bottom of each berth, into which the joints and their supports may partially project, and this recess is covered by a curved metallic plate, $h$.

The mattress should be suitably formed to fit over the plate $h$ without being bulged out thereby.

I am aware that a berth having a counterbalancing-weight has heretofore been connected to a rigid support by a universal joint similar in construction to the joint above described, and that such berth has been provided with downwardly-pulling springs. Therefore I do not claim the joint nor its combination with the berth and weight and springs arranged to pull downwardly.

I am also aware that a pivoted berth has been provided with a single upwardly-pulling spring. Therefore I do not claim an upwardly-pulling spring, but only a series of such springs arranged to pull alike on both ends of berth, the advantages of a series over a single spring being obvious.

I claim—

1. The combination of a weighted lever, $b$, connected at its upper end by a universal joint to a fixed support, and the berth-frame A, connected to said lever by braces $a\ a$, extending from the berth-frame to points on the lever below its center of motion, whereby the center of gravity of the berth is brought close to the center of motion and the lever $b$ is enabled to have the greatest possible length below the center of motion, as set forth.

2. In combination with the berths A B, each pivoted, as described, to an independent support beneath it, the connecting-rods K K, adapted to be contracted between the two berths, and thereby cause the berth A, with its contents and attachments, to act as a counterbalancing-weight for the berth B, as set forth.

3. The combination, with a berth-frame connected to a rigid support by a universal joint and provided with a pendulous weight, of a series of springs arranged to pull upwardly alike on both ends of the berth, whereby the weight of the berth above the center of motion and the friction on the pivots are reduced to the minimum, as set forth.

4. The combination of the berths A B, pivoted, as described, to independent supports, the adjustable connecting-rods K K, and upwardly-pulling springs, all arranged and operating substantially as described.

5. The combination of the universal joint composed of four trunnions arranged at right angles, a berth pivoted to two of said trunnions, supports to which the other trunnions are pivoted, and torsional springs secured to the trunnions and the part of the berth-frame and supports which receive said trunnions, substantially as and for the purpose set forth.

6. A berth-frame pivoted to a fixed support by a universal joint and provided in its bottom with a suitably-formed recess to permit the joint and its support to partially project into the bottom of the berth, as set forth.

CHARLES C. SANDERSON.

Witnesses:
ELLA A. CHASE,
AMY H. SANDERSON.